United States Patent [19]
Cardi et al.

[11] Patent Number: 6,143,824
[45] Date of Patent: Nov. 7, 2000

[54] POLYMERIC COMPOSITIONS

[75] Inventors: Nicoletta Cardi, Novara; Riccardo Po', Livorno; Aldo Longo, Mantova; Andrea Callaioli, Porto Mantovano, all of Italy

[73] Assignee: Enichem, S.p.A., San Donato Milanese, Italy

[21] Appl. No.: 09/316,201

[22] Filed: May 21, 1999

[30] Foreign Application Priority Data

May 26, 1998 [IT] Italy ................... MI98A1156

[51] Int. Cl.$^7$ ............ C08L 71/12; C08L 33/00
[52] U.S. Cl. ............ 525/66; 525/71; 525/92 D; 525/92 E
[58] Field of Search ............ 525/66, 71, 92 D, 525/92 E

[56] References Cited

U.S. PATENT DOCUMENTS 4,866,126  9/1989  Mylonakis et al. ............ 525/68

FOREIGN PATENT DOCUMENTS

| 0 337 165 | 10/1989 | European Pat. Off. |
| 0 337 165 A3 | 10/1989 | European Pat. Off. |
| 0 564 039 A3 | 10/1993 | European Pat. Off. |
| 0 693 510 A1 | 1/1996 | European Pat. Off. |
| 1 274 466 | 5/1972 | United Kingdom. |

OTHER PUBLICATIONS

Takeshi Fukuda, et al. "Well–Defined Block Copolymers Comprising Styrene–Acrylonitrile Random Copolymer Sequences Synthesized by 'Living' Radical Polymerization" Macromolecules, vol. 29, No. 8, Apr. 8, 1996, pp. 3050–3052, XP000559670.

Derwent Abstract No. XP002115828 1989.

Irja Piirma, et al. "Block Copolymers Obtained by Free–Radical Mechanism. I. Methyl Methacrylate and Styrene", Journal of Applied Polymer Science, vol. 24, 1979, pp. 2051–2070.

Won Ho Jo, et al. "Compatibilizing Effect of a Styrene–Methyl Methacrylate Block Copolymer on the Phase Behavior of Poly(2,6–dimethyl–1,4–phenylene oxide) and Poly(styrene–co–acrylonitrile) Blends", Macromolecules, vol. 24, No. 9, Apr. 29, 1991, pp. 2231–2235.

Derwent Abstracts, Accession No. 89–109384, JP 01–054052 A, Mar. 1, 1989.

*Primary Examiner*—Ana Woodward
*Attorney, Agent, or Firm*—Oblon, Spivak, McClelland, Maier & Neustadt, P.C.

[57] ABSTRACT

Polymeric compositions comprising:

a) at least one aromatic thermoplastic polymer or a vinylaromatic thermoplastic (co)polymer;

b) at least one thermoplastic resin selected from a (co)polymer optionally modified with rubber, comprising a vinylaromatic monomer and/or a monomer deriving from (meth)acrylic acid and thermoplastic polyesters;

c) a compatibilizing block polymer, with at least two blocks, which can be obtained by means of a living radicalic polymerization process.

8 Claims, No Drawings

POLYMERIC COMPOSITIONS

The present invention relates to polymeric compositions.

More specifically, the present invention relates to compositions of two thermoplastic polymers containing a compatibilizing agent, which have characteristics of improved compatibility with respect to formulations without said agent.

In the field of plastic materials, the mixing of polymers is a method used for obtaining new materials which, having a combination of the characteristics of the single components, have improved properties.

In practice, however, examples of polymeric mixtures with these characteristics are very limited, because the incompatibility (immiscibility) of the components of the mixture, deriving, for example, from the different polarity of the components, actually causes a deterioration in the properties resulting in a material with such poor properties as to be of no commercial or practical value.

An example of this behaviour is polystyrene (PS) and the styrene-acrylonitrile copolymer (SAN) which cannot be mixed. It would be extremely interesting to be able to obtain polymeric mixtures of the above components as they could be recycled both on the level of industrial production and the end-products deriving from after-use.

Also of great interest would be the possibility of obtaining co-extruded film in a PS film could give characteristics of improved brightness to the SAN film in turn capable of providing better mechanical properties.

Finally, it should be remembered that styrene-acrylonitrile copolymers with different contents of acrylonitrile are also immiscible with each other and that therefore, also in this case there are difficulties in recycling them.

A method for obtaining compatible mixtures is based on the use of compatibilizing agents, consisting of block polymers which contain two or more fragments of polymeric chain having characteristics of compatibility with those of the blend components. Published German patent applications 3,540,045 and 3,540,046 describe mixtures of SAN (ABS) and polyphenylene ethers compatibilized by polystyrene-polycaprolactone block copolymers.

A problem for this type of technology is linked to the fact that the block copolymers are generally obtained by means of anionic polymerization, a particularly difficult and costly process as it requires the use of extremely pure solvents and monomers, or by the reactive modification of functionalized polymers and their coupling reaction. The coupling reaction is not quantitative and is generally carried out in the molten state with consequent degradative phenomena which compete with the reaction itself. In addition, the end-product has a high cost owing to the complexity of the process.

The Applicant has now found that it is possible to prepare polymeric mixtures based on aromatic or vinylaromatic polymers, for example polyphenylethers or polystyrene, and (co)polymers comprising a vinylaromatic monomer and/or a monomer deriving from (meth)acrylic acid, for example ABS or SAN resins, with the use of a compatibilizing block polymer obtained by living radicalic polymerization.

The present invention therefore relates to polymeric compositions comprising:
a) at least one thermoplastic polymer selected from polystyrene, high impact polystyrene and polyphenylenether;
b) at least one thermoplastic resin selected from styrene/acrylonitrile copolymers, acrylonitrile/butadiene/styrene copolymers, acrylonitrile/ethylene-propylene-diene/styrene copolymers and polycarbonate;
c) a compatibilizing block polymer, with at least two blocks, which can be obtained with a living radicalic polymerization process which comprises:
   i) polymerizing at least one vinylaromatic monomer in the presence of a living radical initiating system, until a conversion ranging from 5 to 99% is reached;
   ii) feeding acrylonitrile to the polymerization mixture in such a quantity as to have a molecular weight of the block copolymer lower than 1,000,000, at the end of the polymerization;
   iii) optionally repeating, once or twice, step (i), or steps (i)+(ii) or (i)+(ii)+(i);
   iv) recovering the block polymer thus obtained.

According to the present invention, the polymeric compositions object thereof, can have a very wide formulation. For example component (a) can be present in a quantity ranging from 5 to 95% by weight, with respect to components (a) and (b) and, analogously, the concentration of component (b) can range from 95 to 5% by weight.

The compatibilizing polymer of step (c) is added to this composition and can be added in a quantity ranging from 0.3 to 30% by weight with respect to the total of (a)+(b).

The compatibilizing polymer can contain at least two blocks, two (i)–(ii), or three (i)–(ii)–(i), being preferred.

According to the present invention, the preferred vinylaromatic monomer used for preparing the first block (i) is styrene even if other vinylaromatic monomers deriving from styrene can be used alone or mixed with each other and/or optionally in the presence of styrene. Examples of vinylaromatic monomers deriving from styrene comprise alkyl styrenes, in which the alkyl group contains from 1 to 4 carbon atoms, halogenated styrenes, $C_1$–$C_4$-alkoxy styrenes. Illustrative examples are: p-methylstyrene, m-methylstyrene, alone or mixed with each other, ethylstyrene, butylstyrene, dimethylstyrene, chlorostyrene, bromostyrene, methoxystyrene, acetoxy-styrene, etc.

The compatibilizing polymers of the present invention can be prepared starting from the vinylaromatic monomer and acrylonitrile and living radical initiating systems, using the general procedure described hereunder. Groups of living radical initiating systems suitable for this type of process are selected from those listed below, wherein the term alkyl indicates a $C_1$–$C_4$ alkyl hydrocarbon: tetra-alkylthiouram disulfides, alkyldithiocarbamates, ethers of benzopinacol, esters of benzopinacol, dicyanosubstituted tetraphenylethane, triphenylmethylazo alkyls, benzylnitroxyl derivatives, mixtures of nitroxyl radicals and radical generator compounds such as, for example, mixtures of nitroxyl radicals and peroxides, mixtures of nitroxyl radicals and hydroperoxides, mixtures of nitroxyl radicals and peresters, mixtures of nitroxyl radicals and percarbonates, mixtures of nitroxyl radicals and azobisdialkyldinitriles, mixtures of nitroxyl radicals and tetra-alkylthiouramdisulfides; alkoxyamines described in U.S. Pat. No. 4,581,429; alkylnitroxyls.

Specific and particularly preferred examples of initiators are the following: 2,2,6,6-tetramethylpiperidinyloxy radical/dibenzoyl peroxide (in a molar ratio<4, preferably >1 and <3); 2,2,6,6-tetramethylpiperidinyloxy radical/dicumyl peroxide (in a molar ratio<4 preferably >1 and <3); 2,2,6,6-tetramethylpiperidinyloxy radical/N,N'-azobis-(diisobutyronitrile) (<4 or between 1:1–3:1); 1-phenyl-1-(2,2,6,6-tetramethylpiperidinyloxyl) ethane; 2-benzoyl-1-phenyl-1-(2,2,6,6-tetramethylpiperidinyloxyl) ethane; etc.

Once the polymerization of the first vinylaromatic polymeric block has been obtained, according to the present process, acrylonitrile is fed. During this phase, acrylonitrile is mixed with the non-polymerized vinylaromatic monomer and the polymerization is continued in the presence of the same initiator.

The distribution of the two monomers inside the block of step (ii) may be random,

...AASASASSASSSAASAS...

wherein "A" represents a nitrilic unit and "S" a vinylaromatic unit, or alternating:

...ASASASASASASAS...

or, in turn, in blocks:

...AAAAASSSSSSAAAAAASSSSS...

or gradient. The situation in which the distribution is one of the first two, or an intermediate case between them, is preferred.

The polymerization of both steps can be carried out in batch, continuous or semi-continuous, at a temperature ranging from 60 to 160° C., depending on the initiator selected, and at a pressure which is such as to maintain the monomers in liquid phase. In addition, the polymerization can take place in the presence of an organic solvent, in suspension, in emulsion or in mass.

In the batch or semi-continuous process, the living radical initiating system is added to the vinylaromatic monomer in its pure state or in the form of a solution or suspension in a quantity ranging from 0.01 to 2% in moles with respect to the total moles of monomers.

In the continuous process the vinylaromatic monomer, living radical initiating system and, optionally, a solvent are fed in continuous to a polymerization reactor with a flow-rate which is such as to provide suitable residence times for reaching conversions preferably ranging from 5 to 95%. The reaction product is fed to a second reactor together with acrylonitrile. At the outlet of this second reactor, the reaction mixture is treated to recover the block polymer.

Optionally, but not necessarily, the living radical initiating system can be slowly added during the whole duration of the reaction or part of it. Also one of the two monomers or both of them can be dosed in portions in successive times to vary the microstructure of the AS block as desired. At the end, the polymer is isolated from the polymerization mixture with one of the methods known in the art, for example, by precipitation in a suitable non-solvent, or by removal of the non-reacted monomer under vacuum and/or at a high temperature.

At the end of the polymerization, extremely pure block copolymers are obtained, in a quantity of more than 50% by weight of the total product. The molecular weight of each of the blocks may be between 1,000 and 500,000, preferably between 5,000 and 200,000 whereas the total molecular weight can vary from 10,000 to 1,000,000, preferably between 20,000 and 500,000.

The polymeric block of step (ii) may contain a fraction of vinylaromatic units ranging from 99 to 30% by weight, preferably between 90 and 60%. The fraction of vinylaromatic units in the total polymer may therefore be between 99.9 and 31%.

Some illustrative but non-limiting examples are provided hereunder for a better understanding of the present invention and for its embodiment.

EXAMPLE 1

920 g of styrene were charged at room temperature (20° C.) into a steel autoclave having a volume of two liters, resistant to a pressure of 20 bars, equipped with an anchor stirrer and plunged pipe for sampling under pressure, jacketed and thermostat-regulated with silicon oil circulation, in a nitrogen environment. The temperature was increased to 60° C., under pumping of nitrogen, with stirring at 100 revs per minute, and 2.28 g (7.06 mmoles) of benzoyl peroxide (as such, stabilized with 25.1% of water) and 1.24 g (7.95 mmoles) of 2,2,6,6-tetramethylpiperidinyloxyl radical (TEMPO) dissolved in 80 g of styrene were added.

The autoclave was then closed and brought to 2 bars of pressure with nitrogen. The reaction temperature was increased to 130° C. in 25 minutes.

After 1 hour and 30 minutes from the moment of reaching 130° C. (34% conversion), 132 g of acrylonitrile were added with a pump, in 10 minutes (so that the mixture residual styrene/acrylonitrile corresponds to the composition of the azeotropic mixture). Three hours after reaching 130° C., the reaction mixture (containing 59% of polymer) was discharged and treated under vacuum at 220° C. to eliminate the non-polymerized residual monomer.

The resulting product (59% conversion) proved to contain 56% of PS-SAN copolymer, having Mw 102,000 and Mw/Mn 1.18.

EXAMPLE 2

A mixture was made of PS/SAN/PS-SAN (obtained from the synthesis of Example 1) with the following percentage composition: 92.7/4.9/2.4. The mixture was extruded with a single-screw micro-extruder having a screw diameter of 12 mm, L/D=$\frac{1}{24}$, extrusion temperature of 240° C. and extrusion rate of 50 revs/min.

The granules obtained from the extrusion were injection moulded and the microsamples obtained (thickness of 4 mm) were subjected to breaking strength (1 mm/min).

The breakage surface was analyzed with the SEM technique. A dimensional reduction in the particles of dispersed PS is noted, demonstrating the surface-active effect of the PS-SAN block copolymer. Adhesion of the PS particles to the SAN matrix is also observed.

COMPARATIVE EXAMPLE 2

The test of example 2 was repeated without using the PS-SAN block copolymer. From SEM analysis of the fractured microsamples it is observed that the spheres of dispersed PS are detached from the SAN matrix owing to their incompatibility.

EXAMPLE 3

The PS-SAN block copolymer was moulded at 180° C. and 35 tons of pressure in a disk having a diameter of 3 cm and a thickness of 0.1 mm. Two disks of PS (Mw=175,000, Mw/Mn=1.75) and SAN (26% of acrylonitrile, Mw=86,000, Mw/Mn=1.75) having a thickness of 1 mm, were moulded under the same conditions.

A moulding, under the same conditions, of overlying PS and SAN disks was carried out with interpositioning of the PS-SAN disk.

There was strong adhesion between the PS and SAN disks and attempts to separate them with a blade caused breakage of the disks.

COMPARATIVE EXAMPLE 3

The process of example 3 was repeated without interpositioning the PS-SAN disk. There was no adhesion between the PS and SAN disks.

What is claimed is:

1. Polymeric compositions comprising:
   a) at least one thermoplastic polymer selected from polystyrene, high impact polystyrene and polyphenylenether;
   b) at least one thermoplastic resin selected from styrene/acrylonitrile copolymers, acrylonitrile/butadiene/styrene copolymers, acrylonitrile/ethylene-propylene-diene/styrene copolymers and polycarbonate;
   c) a compatibilizing block polymer, with at least two blocks, obtained with a living radicalic polymerization process which comprises:
      i) polymerizing at least one vinylaromatic monomer, in the presence of a living radical initiating system, to a conversion of from 5 to 99%;
      ii) feeding acrylonitrile to the polymerization mixture obtained in i) in such a quantity as to have the molecular weight of the block copolymer lower than 1,000,000, at the end of the polymerization process;
      iii) optionally repeating, once or twice, step (i), or steps (i)+(ii) or (i)+(ii)+(i);
      iv) recovering the block polymer thus obtained.

2. The compositions according to claim 1, wherein component (a) is present in a quantity ranging from 5 to 95% by weight with respect to components (a) and (b).

3. The compositions according to any of claims 1 or 2, wherein the compatibilizing polymer (c) is present in quantities ranging from 0.3 to 30% by weight with respect to the total of (a)+(b).

4. The compositions according to any of claims 1 or 2, wherein the compatibilizing polymer contains blocks (i)–(ii) or blocks (i)–(ii)–(i).

5. The compositions according to any of claims 1 or 2, wherein the molecular weight of each of the blocks of the compatibilizing polymer is between 1,000 and 500,000 and the total molecular weight of the compatibilizing polymer is between 10,000 and 1,000,000.

6. The compositions according to any of claims 1 or 2, wherein the polymeric block of step (ii) contains a fraction of vinylaromatic units ranging from 99 to 30% by weight.

7. The compositions according to any of claims 1 or 2, wherein said vinylaromatic monomer is styrene.

8. The compositions according to any of claims 1 or 2, wherein the molecular weight of each of the blocks of the compatibilizing polymer is between 5,000 and 200,000 and the total molecular weight of the compatibilizing polymer is between 20,000 and 500,000.

* * * * *